Patented Apr. 24, 1934

1,956,543

UNITED STATES PATENT OFFICE 1,956,543

RUBBER EMULSION AND PROCESS OF MAKING SAME

Lester Kirschbraun, Leonia, N. J., assignor by mesne assignments, to The Patent and Licensing Corporation, New York, N. Y., a corporation of Massachusetts No Drawing. Original application August 16, 1920, Serial No. 404,014. Divided and this application October 25, 1926, Serial No. 144,178

27 Claims. (Cl. 134—17)

This invention relates to improvements in waterproof sheets and process of making same and refers more particularly to waterproof sheets preferably felted, made from cotton stalks, or analogous paper making fibres, saturated or impregnated with a waterproofing agent.

This application is a division of my copending application Serial No. 404,014, filed August 16, 1920.

Among the objects of the invention are to provide a waterproof sheet consisting of felted cotton stalks, or analogous paper making fibres, which simultaneously with the felting operation are impregnated or saturated with a waterproofing agent, as for example, rubber or asphalt, or combinations thereof.

The invention may be carried out as follows: I preferably take rubber and flux it with a bituminous material, such as asphalt or coal tar pitch, on calender rolls, in the usual way. I then gradually add this rubber compound while it is in a more or less heated plastic condition to a relatively stiff paste of colloidal clay and water, the latter being in a heated condition, as for example, 180° F. The rubber compound is added to the paste in the well known types of kneading or masticating machines, so as to permit the rubber compound to become gradually dispersed in very small particles in the aqueous paste. This mixture is then thinned with the water and forms a non-adhesive emulsified matrix in which the rubber compound is dispersed through the water.

This emulsion is then mixed with pulp stock formed from cotton stalks, or analogous paper making fibres; and the mixture sufficiently thinned with water to permit of it readily flowing over a paper machine where the fibrous constituents thereof are felted. As the water is removed, the dispersed particles of the binder coalesce and unite to form a continuous film throughout the felted sheet of fibrous stock.

If it is desired to vulcanize the sheet thus formed, a vulcanizing agent, as sulphur, may be incorporated with the emulsion, and the sheet is vulcanized as it passes over the drying rolls of the paper machine or over hot calender rolls.

The sheets thus formed may be used as rubber blankets, for waterproof packages, for rubber gaskets, shoe elements, and in fact for a wide variety of usage.

It may be desirable, instead of using fibrous stock entirely, to mix it with a certain percentage of asbestos fiber in order to get a more heat resisting stock, as for example, gaskets subjected to a high temperature.

Having thus described the invention, what I claim is:

1. A process of making an emulsion consisting in first plasticizing rubber and in then dispersing said plasticized rubber in an aqueous vehicle by means of a colloid.

2. A process of making an emulsion consisting in subjecting rubber to the action of a plasticization, in then dispersing said plasticized rubber in an aqueous vehicle by means of an argillaceous colloid to produce an emulsion capable of being thinned with water.

3. The method of dispersing rubber into a colloidal substance which comprises forming a relaitvely stiff aqueous paste of said colloidal substance, and dispersing the rubber into said paste by mastication to produce an emulsion capable of being thinned with water.

4. The method of dispersing rubber into an argillaceous colloid which comprises forming a relatively stiff paste of said colloid with water, and dispersing the rubber into said paste by mastication to produce an emulsion capable of being thinned with water.

5. The method of dispersing rubber into a colloidal substance which comprises forming a relatively stiff paste of said colloidal substance with water, masticating said paste and adding the rubber thereto in plastic form while so masticating said paste.

6. The method of dispersing rubber into a colloidal substance which comprises forming a relatively stiff paste of said colloidal substance with water, plasticizing said rubber, and dispersing the plasticized rubber into said paste by mastication to produce an emulsion capable of being thinned with water.

7. The method of dispersing rubber into a colloidal substance which comprises forming a relatively stiff paste of said colloidal substance in an aqueous vehicle, plasticizing said rubber and adding the rubber in plastic form to said paste while undergoing mastication.

8. The method of dispersing rubber which comprises forming a relatively stiff paste of said colloidal substance in an aqueous vehicle and dispersing the rubber into said paste by mastication while maintaining said paste as a continuous phase.

9. As a new composition of matter, a mixture of rubber and an argillaceous colloid produced by mastication of the two in plastic form, the rubber being dispersed in the colloid.

10. As a new composition of matter, a mixture of rubber and a colloid produced by mastication or kneading of the two in plastic form, the rubber being dispersed in the colloid.

11. The method of dispersing a gum into a colloidal substance which comprises forming a viscous, plastic mass of said colloidal substance, and dispersing the gum into said mass by by mastication while main said colloidal substance as a continuous phase.

12. The method of dispersing a gum into a hydrophilic colloid which comprises forming a viscous paste of said colloid with water, and dispersing the gum into said paste by mastication while maintaining said paste as a continuous phase.

13. The method of dispersing rubber into a colloidal substance which comprises forming a viscous, plastic mass of said colloidal substance, and dispersing the rubber into said mass by mastication while maintaining said paste as a continuous phase.

14. The method of dispersing rubber into a hydrophilic colloid which comprises forming a viscous paste of said colloid with water, and dispersing the rubber into said paste by mastication while maintaining said paste as a continuous phase.

15. As a new composition of matter, a mixture of a gum and a hydrophilic colloid produced by mastication of the two in plastic form, the gum being dispersed in a continuous phase comprising said colloid.

16. As a new composition of matter, a mixture of rubber and a hydrophilic colloid produced by mastication of the two in plastic form, the rubber being dispersed in a continuous phase comprising said colloid.

17. The process of making a rubber emulsion, which consists in forming a relatively stiff colloidal plate, adding a rubber compound to the paste, and thoroughly mixing the same together to thereby permit the rubber compound to be dispersed in small particles in the paste.

18. A process of making a rubber emulsion which consists in first forming a relatively stiff paste of an emulsifying agent and water, adding a rubber compound, and thoroughly mixing the two together to thereby disperse the rubber particles in the paste, and in finally thinning the mixture and forming a non-adhesive emulsifying matrix in which the rubber compound is dispersed through the water.

19. The process of making a rubber emulsion which consists in first forming a relatively viscous plastic paste containing an emulsifying agent and a fluid vehicle, adding a rubber compound to the paste, and masticating the mixture to thoroughly disperse very fine particles of the rubber in the paste to thereby obtain an emulsion in which the rubber compound is dispersed through the fluid vehicle.

20. The method of dispersing a gum into a colloidal substance which comprises forming a viscous paste of said substance with a solvent, and dispersing the gum into said paste by mastication while maintaining said paste as a continuous phase.

21. The method of dispersing a gum into a colloidal substance which comprises forming a viscous paste of said colloidal substance with a solvent, softening said gum, and dispersing the gum into said paste by mastication while maintaining said paste as a continuous phase.

22. The method of dispersing rubber into a colloidal substance which comprises forming a viscous paste of said substance with a solvent, and dispersing the rubber into said paste by mastication while maintaining said paste as a continuous phase.

23. The method of producing a composition of matter which comprises forming a plastic, colloidal mixture of a gum and a colloid, the gum being in disperse phase, and thinning said plastic, colloidal mixture with a solvent until it is substantially liquid.

24. The method of producing a composition of matter which comprises forming a plastic, colloidal mixture of rubber and a hydrophilic colloid, the rubber being in disperse phase, and thinning said plastic, colloidal mixture with a solvent until it is substantially liquid.

25. The method of dispersing a gum into a colloidal substance which comprises forming a viscous paste of said substance with a solvent, dispersing the gum into said paste by mastication while maintaining said paste as a continuous phase, and thereafter thinning the mass with a solvent of said substance until the product is substantially liquid.

26. The method of dispersing rubber into a colloidal substance which comprises forming a viscous paste of said substance with a solvent, dispersing the rubber into said paste by mastication while maintaining said paste as a continuous phase, and thereafter thinning the mass with a solvent of said substance until the product is substantially liquid.

27. The method of dispersing rubber into a hydrophilic colloid which comprises forming a viscous paste of said colloid with water, softening said rubber, masticating said paste, adding the softened rubber, in plastic form, to said paste, while so masticating the latter, and adding water to said paste from time to time to prevent it from excessively hardening.

LESTER KIRSCHBRAUN.